United States Patent [19]

Jandl et al.

[11] Patent Number: 5,725,198
[45] Date of Patent: Mar. 10, 1998

[54] NON-ROTATING NEEDLE VALVE

[75] Inventors: Steven A. Jandl, Lodi; Duncan P. L. Bathe, Madison, both of Wis.

[73] Assignee: Ohmeda Inc., Liberty Corner, N.J.

[21] Appl. No.: 602,537

[22] Filed: Feb. 20, 1996

[51] Int. Cl.$^6$ .................................................. F16K 31/50
[52] U.S. Cl. ................. 251/122; 251/205; 251/214; 251/229; 251/276; 251/900; 251/903
[58] Field of Search .................. 251/86, 88, 121, 251/122, 205, 218, 214, 263, 264, 276, 278, 331, 335.2, 335.3, 903, 229, 900

[56] References Cited

U.S. PATENT DOCUMENTS

| | | | |
|---|---|---|---|
| 3,049,332 | 8/1962 | Webster | 251/88 |
| 3,194,533 | 7/1965 | McLay | 251/122 |
| 3,305,207 | 2/1967 | Calderoni et al. | 251/278 |
| 3,365,166 | 1/1968 | Smith | 251/122 |
| 3,419,246 | 12/1968 | Burgess | 251/263 |
| 3,491,789 | 1/1970 | Callahan, Jr. et al. | 251/88 |
| 3,538,951 | 11/1970 | Bownass | 251/122 |
| 3,679,169 | 7/1972 | Bedo et al. | 251/122 |
| 3,761,053 | 9/1973 | Bedo et al. | 251/122 |
| 4,114,851 | 9/1978 | Shivak et al. | 251/122 |
| 4,657,162 | 4/1987 | Folter et al. | 251/122 |
| 4,804,164 | 2/1989 | Nakazawa et al. | 251/335.3 |
| 4,911,412 | 3/1990 | Danko | 251/335.3 |
| 5,232,195 | 8/1993 | Torrielli | 251/122 |
| 5,295,662 | 3/1994 | Yamaji et al. | 251/331 |
| 5,324,000 | 6/1994 | Peickert | 251/122 |
| 5,351,936 | 10/1994 | Tanikawa et al. | 251/278 |
| 5,439,197 | 8/1995 | Itoi et al. | 251/276 |

*Primary Examiner*—George L. Walton
*Attorney, Agent, or Firm*—Roger M. Rathbun; Salvatore P. Pace

[57] ABSTRACT

A needle valve in which the needle is moved with respect to its valve seat. The distal end of the needle has a length of a constant, uniform diameter that allows the flow to reach a maximum flow and not change while that finite length is moving within the valve seat. This allows a less critical placement of a stop that prevents further movement of the needle away from its valve seat.

2 Claims, 2 Drawing Sheets

NON-ROTATING NEEDLE VALVE

BACKGROUND OF THE INVENTION

This invention relates to flow control valves and, more particularly, to a needle valve having a non-rotating tapered needle that moves axially along its main axis within a circular valve seat to control the flow of a gas and which has a specially shaped needle profile and a positive means to withdraw the needle from the valve seat.

Currently, needle valves are widely used to control the flow of fluid with considerable precision, and one such use is in association with anesthesia machines used to administer an anesthetic under controlled flow to a patient.

One of such valves of the non-rotatable type is described in U.S. Pat. No. 5,324,000 and which utilizes a non-rotating needle that is moved by means of an adjusting means toward and away from the valve seat where the flow is controlled. The adjusting means is threadedly engaged to the valve housing and when rotated, moves the needle through a contact device, such as a sphere, to minimize friction between the elements and allow ease of movement of the needle.

One of the difficulties with the valve shown in that patent is the inability to include a positive linkage or connection between the adjusting means and the needle and when the needle is forced forwardly to the off position or no flow state, it is possible for the distal end of the needle to become wedged into the valve seat such that the spring bias is not sufficient to cause the needle to withdraw from that closed position when the operator backs off on the adjusting means.

Accordingly, the operator may, at times, be unable to reopen the needle valve to allow the flow to again be started and controlled.

A further difficulty with current needle valves in general is the need to control the dimensions of the needle movement so that the maximum flow is a known, limited value. In the normal needle valve, the needle is tapered and the needle moves with respect to its seat, the tapered portion moving with respect to the valve seat to control the flow and when the needle is withdrawn from the valve seat, the flow is at a full or maximum flow value. It is important that the maximum flow be controlled, and thus the dimensions of the valve are carefully controlled so that the withdrawal of the needle or its adjusting means reaches a physical stop and the needle cannot be further withdrawn.

Again, since that maximum flow itself needs to be known and controlled, the amount of the movement of the needle must be precisely controlled so that the stop is accurately positioned and therefore the construction of the needle valve is costly due to the need to precisely locate the stop at the proper position.

SUMMARY OF THE INVENTION

The needle valve of the present invention overcomes the aforedescribed difficulties by providing a needle valve where the needle moves with respect to the valve seat by means of an adjusting means that is threadedly engaged to the needle housing. As the adjusting means is rotated by the user, it can move forward toward the valve seat and thereby engage the proximal end of the needle and move that needle in the direction toward the valve seat to reduce the flow through the needle valve.

When the adjusting means is rotated so as to move in the direction away from the valve seat, a spring force moves the needle in the direction away from the valve seat to keep the needle in engagement with the threaded adjustment means. In the event the needle has been forced into the seat so that the spring force cannot move the needle away from the seat, a positive connection between the distal end of the adjusting means and the proximal end of the needle will physically pull the needle from the seat so that flow through the needle valve may be increased.

Once freed from the jammed position, the spring force again acts to bias the proximal end of the needle against the distal end of the adjusting means as the needle if further withdrawn.

The connection means is preferable a split collet that engages flanges on the proximal end of the needle and the distal end of the adjusting means such that assembly is relatively easy and does not require expensive operations in constructing the valve.

The needle valve of the present invention also has a specially shaped profile needle that moves with respect to the valve seat to control flow. In the present invention, the distal end of the needle itself has a certain length thereof that is cylindrical, that is, there is no taper as is common with the normal needle. Thus as the needle is withdrawn, the needle reaches a point where the constant diameter portion is within the valve seat and continued withdrawal of the needle does not result in a further change in the flow.

At that point, therefore, the valve has reached the maximum flow since the needle profile is no longer tapered and a known maximum flow can be achieved by determining the diameter of the constant diameter, cylindrical distal end. Considerable flexibility is therefore built into the construction of the needle valve since it is not necessary to precisely position a stop for the needle and the stop may vary in its position within more reasonable limits, yet the valve will still reach a maximum, known flow with precision.

The foregoing and other advantages and features of the present invention will become apparent from the following description.

BRIEF DESCRIPTION OF THE DRAWINGS

The invention is diagrammatically illustrated by way of example in the drawing appended hereto, in which.

DESCRIPTION OF THE PREFERRED EMBODIMENT

Figure 1:
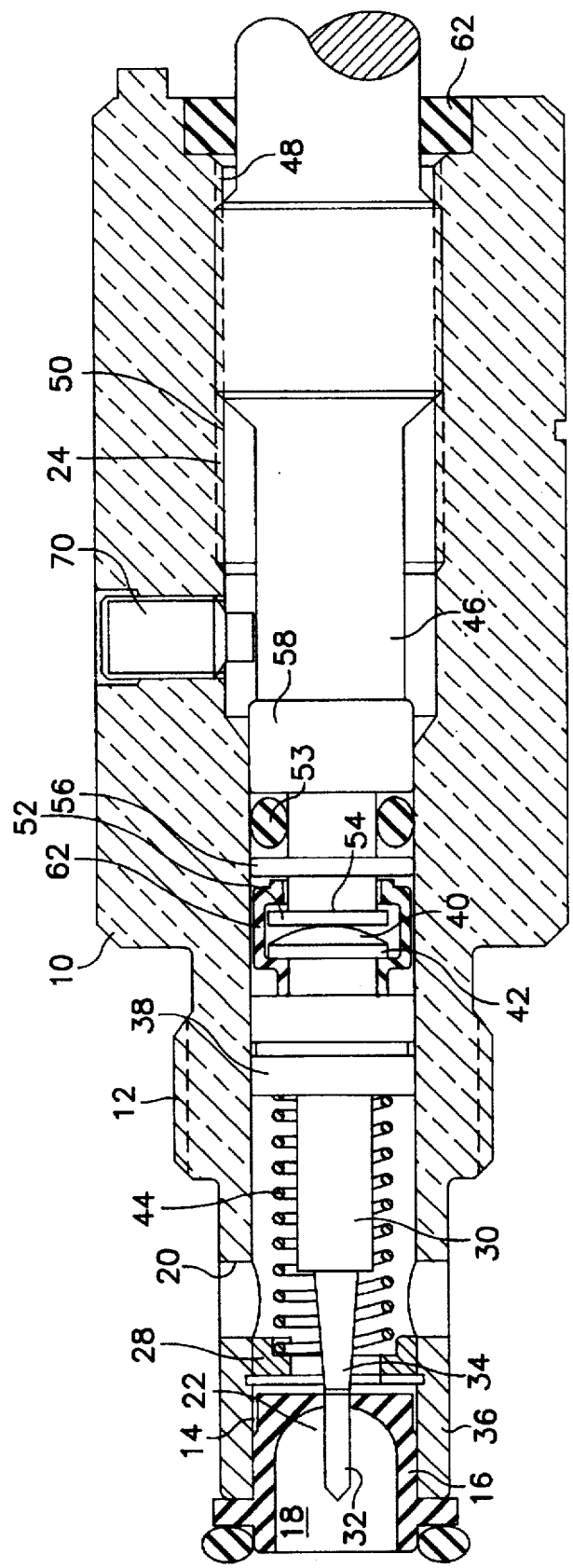
FIG. 1 is a cross sectional view of a needle valve constructed in accordance with the present invention.

In FIG. 1, there is shown a cross-sectional view of a needle valve constructed in accordance with the present invention and which includes a valve housing 10 constructed preferably of a bronze alloy material. External threads 12 are formed on the exterior of the valve housing 10 and are used to affix the valve housing to a valve block having the appropriate passageways (not shown) to conduct the fluid to and from the needle valve. As used herein, the end of the needle valve that is to be affixed to the valve block will be referred to as the distal end and the opposite end referred to as the proximal end and such designations shall apply to all components to be described herein.

At the distal end of the valve housing 10, there is formed a valve seat bore 14 and into which is press fitted a valve seat 16. Valve seat 16 is preferably formed of brass or, alternatively, formed of a fluorocarbon polymer material such as available under the trade name Kel-F and has a large cylindrical opening 18 therethrough. With the valve seat 16 in position as shown in FIG. 1, an inlet 20 is formed at the distal end of the valve seat 16 and an outlet 22 comprises an opening in the valve housing 10. A flow path for the fluid being controlled is thus present between the inlet 20 and outlet 22 passing through the valve seat 16.

Figure 2:
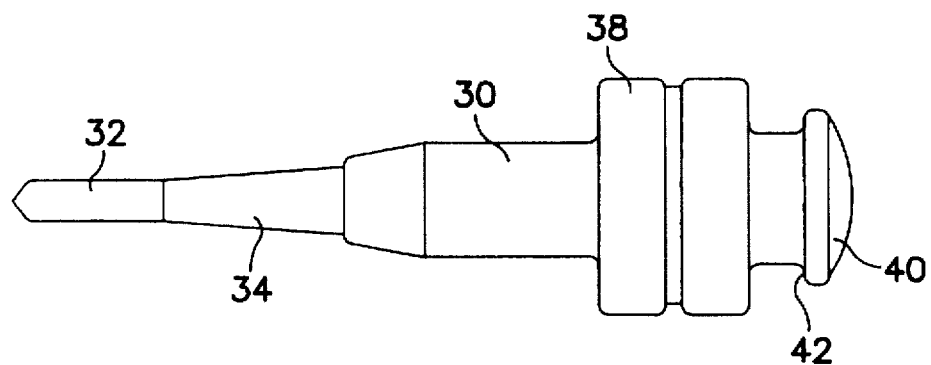
FIG. 2 is an enlarged side view of a needle used with the present invention.

Valve housing 10 has various bores, the purpose of which will be explained. At the proximal end of valve housing 10, there is an outer bore 24 and which enters into an inner bore 26 having a smaller diameter. At the distal end of the inner bore 26 there is a retainer 28 that is snap fitted within the inner bore 26. A needle 30 is provided within the valve housing 10 and can be described with reference to both FIG. 1 and FIG. 2 which is an enlarged side view of the needle 30.

The distal end of the needle 30 has a constant diameter, cylindrical portion 32 of a predetermined length and a tapered portion 34 inwardly of the constant diameter portion, also of a predetermined length. The tapered portion 34 is tapered at a specific angle and within certain tolerances. As shown in FIG. 1, the distal end of the needle 30, including both the constant diameter portion 32 and the tapered portion 34, enters a reduced cylindrical opening 36 in valve seat 16 and acts in conjunction with valve seat 16 to control the flow of fluid passing between inlet 20 and outlet 22.

As can be seen, as the tapered portion 34 is withdrawn or retracted from valve seat 16, the taper creates a larger torroidal opening through cylindrical opening 36 and thus increases the flow of fluid passing through the flow path between inlet 20 and outlet 22. Conversely, as tapered portion 34 moves into the valve seat 16, the flow of that fluid is reduced. As also can be seen, when the constant diameter portion 32 of the needle is moved in either direction where it is within the cylindrical opening 36, the overall opening of the flow path does not change and the flow is, therefore, maintained at a constant flow rate.

Needle 30 is supported through a close tolerance fitting within inner bore 26 through a flange 38 having sufficient width, such as a double flange, in order to provide a guide for the movement of the needle 30 within the valve housing 10. That alignment insures that the needle 30 is properly positioned with respect to the cylindrical opening 36 in valve seat 16.

At the proximal end of the needle 30 there is an enlarged cylindrical head 40 having a flange 42 extending outwardly therefrom and, in the preferred embodiment, the proximal end of the enlarged cylindrical head 40 is shaped in the form of an arcuate surface. The function of the arcuate surface will be later explained. A spring biasing means is provided to bias the needle 30 towards its retracted position with respect to valve seat 16 or away from the valve seat 16 and such biasing means may be a compression spring 44 that is compressed between the retainer 28 and the distal surface of the flange 38.

An adjusting means is provided in order to cause the axial movement of the needle 30 and in its preferred form, the adjusting means is an adjustment screw 46. Adjustment screw 46 is shown in FIG. 1 and has external threads 48 that interfit with internal threads 50 in the valve housing 10 such that rotation of the adjustment screw 46 causes it to move axially with respect to the valve housing 10. The threaded engagement between the adjustment screw 46 and valve housing 10 may have a pitch which assures the desired flow range for a determined number of rotations of adjustment screw 46.

At the distal end of adjustment screw 46, a head 52 is formed having an external diameter that forms a flange 54 at that distal end. As can also be seen, the distal surface of the head 52 is a flat, planar surface. The adjustment screw 46 is aligned within the outer bore 24 by means of a flange 56 and a larger enlarged portion 58, both of which are machined to fit closely within the inner bore 26 to allow the adjustment screw 46 to move therein and to align the axial center line of the adjustment screw 46 with the internal centerline of the inner bore 26. An O-ring 53 is located intermediate flange 56 and the enlarged portion 58 to provide a seal along the adjustment screw 46.

Accordingly, as can be seen at this point, the distal, flat planar end of the adjustment screw 46 bears against the proximal arcuate end of the needle 30 and, therefore, by simply rotating the adjustment screw 46 by means such as a knob, (not shown), the user can cause axial movement of the needle 30 with respect to the valve seat 16 to thereby control the flow of the gas passing through the needle valve.

The contact between the distal end of the adjustment screw 46 and the proximal end of the needle 30 is through the mating of the flat planar surface of the head 52 of adjustment screw 46 and the cylindrical head 40 of the needle 30 such that the contact is basically a point contact to minimize the effect of friction as the rotating member, the adjustment screw 46 pushes against the needle 30. The contact is maintained throughout the operation of the needle valve by the spring bias acting against the needle 30.

As stated, in the event that the needle 30 becomes jammed into its valve seat 16, a positive connection is formed between the proximal end of the needle 30 and the distal end of the adjustment screw 46 to insure that the adjustment screw 46 physically pulls the needle 30 when the adjustment screw 46 is rotated in the direction so as to move the adjustment screw 48 away from the valve seat 16, thus also moving the needle away from the valve seat 16. In the preferred embodiment, the connection means is a split collet 62 that is fitted over the distal end of the adjustment screw 46 and the proximal end of the needle 30.

Figures 3, 3A:
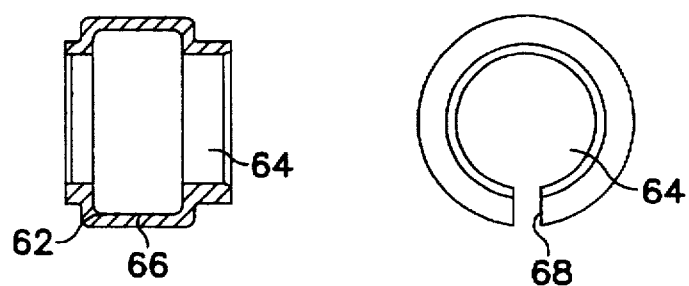
FIGS. 3 and 3A are side and end views, respectively, of the connecting means used with the present invention.

As can be seen particularly in FIGS. 3A and 3B, along with FIG. 1, the split collet 62 is preferably of a plastic material with some flexibility such as Delrin and has a through bore 64 with an expanded, annular section 66. The overall split collet 62 has an opening 68 so that it may be expanded to be slipped over the ends of the needle 30 and the adjustment screw 46.

In assembly, the split collet 62 is forced over the head 52 of adjustment screw 46 and the cylindrical head 40 of the needle 30 such that both the head 52 and the cylindrical head 40 are retained within the annular section 64, thus positively joining together the needle 30 and the adjustment screw 46.

By the proper dimensioning of the split collet 62, the distal end of the adjustment screw 46 and the proximal end of the needle 30 are held captive. Under normal operation, as the adjusting screw 46 is rotated in the direction to cause it to move away from the valve seat 16, the spring 44 will keep the cylindrical head 40 of the needle in contact with the head 52 of the adjusting screw 46. If the needle 30 becomes jammed into the valve seat 16, as the adjusting screw 46 is rotated in the direction to cause it to move away from the valve seat 16, the split collet 62 will bear against the flanges 42 and 54 and physically pull the needle 30 away from the valve seat 16, thus opening the needle valve for increased flow. Once the needle 30 has been released from the valve seat 16, the needle valve will operate as described previously.

As noted, once the needle 30 has been freed from its jammed state, the spring 44 will again exert its bias to cause the cylindrical head 40 of needle 30 to contact head 52 of adjusting means 46. Split collet 62 thus no longer contacts both flange 42 and 54 such that the rotational movement of adjusting means is not transmitted via the split collet 62 to the needle 30.

As the needle 30 travels away from the valve seat 16 by means of adjustment screw 36, the enlarged portion 58 of adjustment screw 46 will ultimately bear against a stop screw 70 threaded into the valve housing 10. At that point, further withdrawal of the needle 30 from the valve seat 16 is not possible and the needle valve is allowing the maximum flow of gas.

Due to the use of the cylindrical portion 32 where a uniform diameter needle is moving within the valve seat 16, the needle 30 will ultimately hit a position upon movement away from the valve seat 16 where the flow will not increase but will maintain steady at the maximum flow. Thus, for that distance where the cylindrical portion 34 operative within valve seat 16, the stop screw 70 has a certain latitude of its position with respect to the valve housing, that is, the stop screw 70 need not be precisely located along the valve housing 10 since there is a finite movement of the needle 30 that does not produce a change in flow of the gas, but will stop at a predetermined maximum flow. Therefore, some manufacturing costs can be reduced by avoiding the need for a close tolerance in the positioning of the stop screw 70.

While the present invention has been set forth in terms of a specific embodiment, it will be understood that the needle valve herein disclosed may be modified or altered by those skilled in the art to other configurations. Accordingly, the invention is to be broadly construed and limited only by the scope and spirit of the claims appended hereto.

We claim:

1. A needle valve for control of the flow of gas, said needle valve comprising a valve housing, said valve housing having an inlet and an outlet and defining a flow path for the flow of gas between said inlet and said outlet, a valve seat in said flow path including an opening, a needle having a distal end and a proximal end, said distal end having a constant diameter for a predetermined length and a tapered portion located immediately inwardly of said constant diameter portion and having a taper that increases in diameter toward said proximal end, said distal end positioned within said valve seat opening and movable toward and away from said valve seat opening to decrease and increase, respectively, the flow of gas through said seat passing from said inlet to said outlet through said valve seat opening when said tapered portion of said needle is movable within said valve seat opening and to maintain the flow of gas constant through said valve seat opening irregardless of the position of said constant diameter portion of said needle within said valve seat opening, biasing means adapted to bias said needle away from said valve seat, an adjusting means threadedly engaged within said valve housing, said adjusting means being rotatable with respect to said housing to move said adjusting means laterally within said valve housing toward and away from said valve seat, said adjusting means having a distal end contacting the proximal end of said needle to move said needle toward and away from said valve seat for varying and maintaining the constant flow of gas through said valve seat opening.

2. A needle valve for control of the flow of gas, said needle valve comprising a valve housing, said valve housing having an inlet and an outlet and defining a flow path for the flow of gas between said inlet and said outlet, a valve seat in said flow path including an opening, a needle having a distal end and a proximal end, said distal end having a constant diameter for a predetermined length and a tapered portion located immediately inwardly of said constant diameter portion and having a taper that increases in diameter toward said proximal end, said distal end positioned within said valve seat opening and movable toward and away from said valve seat opening to decrease and increase, respectively, the flow of gas through said seat passing from said inlet to said outlet through said valve seat opening when said tapered portion of said needle is movable within said valve seat opening and to maintain the flow of gas constant through said valve seat opening regardless of the position of said constant diameter portion of said needle within said valve seat opening, biasing means adapted to bias said needle away from said valve seat, a movable means adapted to move said needle with respect to said valve housing to move said needle toward and away from said valve seat for varying and maintaining the constant flow of gas through said valve seat opening.

* * * * *